United States Patent
Ginsberg

(10) Patent No.: US 9,043,138 B2
(45) Date of Patent: May 26, 2015

(54) SYSTEM AND METHOD FOR AUTOMATED UPDATING OF MAP INFORMATION

(75) Inventor: Matthew L. Ginsberg, Eugene, OR (US)

(73) Assignee: Green Driver, Inc., Eugene, OR (US)

( * ) Notice: Subject to any disclaimer, the term of this patent is extended or adjusted under 35 U.S.C. 154(b) by 1200 days.

(21) Appl. No.: 11/851,953

(22) Filed: Sep. 7, 2007

(65) Prior Publication Data

US 2009/0070031 A1  Mar. 12, 2009

(51) Int. Cl.
    G01C 21/30    (2006.01)
    G01C 21/32    (2006.01)

(52) U.S. Cl.
    CPC .................... G01C 21/32 (2013.01)

(58) Field of Classification Search
    USPC ................................. 701/400–541
    See application file for complete search history.

(56) References Cited

U.S. PATENT DOCUMENTS

| | | | |
|---|---|---|---|
| 4,713,767 A | 12/1987 | Sato et al. | |
| 4,731,613 A | 3/1988 | Endo et al. | |
| 4,882,689 A | 11/1989 | Aoki | |
| 4,903,212 A | 2/1990 | Yokouchi et al. | |
| 4,926,336 A * | 5/1990 | Yamada | 701/202 |
| 4,994,971 A * | 2/1991 | Poelstra | 701/35 |
| 5,060,162 A | 10/1991 | Ueyama et al. | |
| 5,087,919 A | 2/1992 | Odagawa et al. | |
| 5,155,688 A | 10/1992 | Tanaka et al. | |
| 5,179,519 A | 1/1993 | Adachi et al. | |
| 5,272,483 A | 12/1993 | Kato | |
| 5,272,638 A * | 12/1993 | Martin et al. | 455/456.5 |
| 5,307,277 A | 4/1994 | Hirano | |
| 5,313,200 A | 5/1994 | Sone | |
| 5,374,933 A | 12/1994 | Kao | |
| 5,383,127 A | 1/1995 | Shibata | |
| 5,390,125 A | 2/1995 | Sennott et al. | |
| 5,416,712 A | 5/1995 | Geier et al. | |
| 5,442,559 A | 8/1995 | Kuwahara et al. | |
| 5,469,158 A | 11/1995 | Morita | |
| 5,469,360 A | 11/1995 | Ihara et al. | |
| 5,485,161 A | 1/1996 | Vaughn | |
| 5,488,559 A | 1/1996 | Seymour | |
| 5,493,291 A | 2/1996 | Brüggemann | |

(Continued)

FOREIGN PATENT DOCUMENTS

| CN | 101093168 A | 12/2007 |
|---|---|---|
| CN | 101118559 A | 2/2008 |

(Continued)

OTHER PUBLICATIONS

United States Office Action, U.S. Appl. No. 12/886,100, Oct. 15, 2013, twelve pages.

(Continued)

Primary Examiner — Bhavesh V Amin
(74) Attorney, Agent, or Firm — Fenwick & West LLP

(57) ABSTRACT

Traffic information readings corresponding to a vehicle are received, the readings including at least a location. The traffic information readings are compared to information already within a map database, and are used to derive additional map information augmenting or correcting that already within the database, the additional map information subsequently being stored in the database. Additional information that is derived includes the presence of stop signs and traffic lights at intersections, the legality of turns at certain times of day, and the connectedness or non-connectedness of road segments.

12 Claims, 3 Drawing Sheets

(56) References Cited

U.S. PATENT DOCUMENTS

| | | |
|---|---|---|
| 5,504,482 A | 4/1996 | Schreder |
| 5,523,765 A | 6/1996 | Ichikawa |
| 5,530,651 A | 6/1996 | Uemura et al. |
| 5,537,323 A | 7/1996 | Schulte |
| 5,546,311 A * | 8/1996 | Sekine .................. 701/208 |
| 5,552,990 A | 9/1996 | Ihara et al. |
| 5,608,391 A | 3/1997 | Bantli et al. |
| 5,689,423 A | 11/1997 | Sawada |
| 5,699,056 A * | 12/1997 | Yoshida .................. 340/905 |
| 5,739,772 A | 4/1998 | Nanba et al. |
| 5,740,049 A | 4/1998 | Kaise |
| 5,742,923 A | 4/1998 | Odagawa |
| 5,771,484 A | 6/1998 | Tognazzini |
| 5,774,824 A | 6/1998 | Streit et al. |
| 5,821,880 A | 10/1998 | Morimoto et al. |
| 5,831,551 A | 11/1998 | Geduld |
| 5,839,087 A | 11/1998 | Sato |
| 5,847,661 A | 12/1998 | Ricci |
| 5,848,373 A | 12/1998 | DeLorme et al. |
| 5,852,791 A | 12/1998 | Sato et al. |
| 5,862,511 A | 1/1999 | Croyle et al. |
| 5,890,682 A | 4/1999 | Welk |
| 5,910,789 A | 6/1999 | Vigen |
| 5,925,090 A | 7/1999 | Poonsaengsathit |
| 5,940,010 A | 8/1999 | Sasaki et al. |
| 5,941,934 A | 8/1999 | Sato |
| 5,948,042 A * | 9/1999 | Heimann et al. .......... 701/208 |
| 5,949,375 A | 9/1999 | Ishiguro et al. |
| 5,951,620 A * | 9/1999 | Ahrens et al. .............. 701/200 |
| 5,959,577 A * | 9/1999 | Fan et al. ................ 342/357.42 |
| 5,982,298 A * | 11/1999 | Lappenbusch et al. ....... 340/905 |
| 5,987,378 A * | 11/1999 | Schipper et al. ............ 701/207 |
| 5,999,878 A | 12/1999 | Hanson et al. |
| 6,008,740 A | 12/1999 | Hopkins |
| 6,035,253 A * | 3/2000 | Hayashi et al. .............. 701/211 |
| 6,047,234 A | 4/2000 | Cherveny et al. |
| 6,049,303 A | 4/2000 | Biacs et al. |
| 6,057,785 A | 5/2000 | Guthrie |
| 6,067,502 A | 5/2000 | Hayashida et al. |
| 6,078,865 A * | 6/2000 | Koyanagi .................. 701/211 |
| 6,084,543 A * | 7/2000 | Iizuka .................... 342/357.31 |
| 6,122,593 A * | 9/2000 | Friederich et al. .......... 701/202 |
| 6,144,916 A * | 11/2000 | Wood et al. .................. 701/200 |
| 6,150,961 A * | 11/2000 | Alewine et al. ............ 340/995.1 |
| 6,151,550 A * | 11/2000 | Nakatani .................. 701/117 |
| 6,173,232 B1 * | 1/2001 | Nanba et al. ............. 701/209 |
| 6,240,364 B1 * | 5/2001 | Kerner et al. .............. 701/210 |
| 6,246,948 B1 | 6/2001 | Thakker |
| 6,252,544 B1 | 6/2001 | Hoffberg |
| 6,253,150 B1 | 6/2001 | Nakamura |
| 6,269,303 B1 * | 7/2001 | Watanabe et al. .......... 701/209 |
| 6,285,875 B1 | 9/2001 | Alajoki et al. |
| 6,298,302 B2 * | 10/2001 | Walgers et al. ............ 701/209 |
| 6,317,058 B1 | 11/2001 | Lemelson et al. |
| 6,317,685 B1 | 11/2001 | Kozak et al. |
| 6,317,686 B1 * | 11/2001 | Ran ..................... 701/210 |
| 6,333,703 B1 * | 12/2001 | Alewine et al. .......... 340/995.13 |
| 6,338,021 B1 * | 1/2002 | Yagyu et al. .............. 701/209 |
| 6,343,301 B1 | 1/2002 | Halt et al. |
| 6,351,709 B2 * | 2/2002 | King et al. ................ 701/210 |
| 6,353,785 B1 | 3/2002 | Shuman et al. |
| 6,353,796 B1 * | 3/2002 | Schipper et al. .......... 701/207 |
| 6,356,839 B1 | 3/2002 | Monde et al. |
| 6,360,165 B1 | 3/2002 | Chowdhary |
| 6,381,533 B1 | 4/2002 | Crane et al. |
| 6,466,862 B1 * | 10/2002 | DeKock et al. ............ 701/117 |
| 6,472,977 B1 | 10/2002 | Pöchmüller |
| 6,515,596 B2 | 2/2003 | Awada |
| 6,516,267 B1 * | 2/2003 | Cherveny et al. .......... 701/409 |
| 6,516,273 B1 * | 2/2003 | Pierowicz et al. .......... 701/301 |
| 6,526,352 B1 | 2/2003 | Breed et al. |
| 6,535,140 B1 | 3/2003 | Goss et al. |
| 6,539,300 B2 | 3/2003 | Myr |
| 6,553,308 B1 | 4/2003 | Uhlmann et al. |
| 6,574,550 B2 | 6/2003 | Hashida |
| 6,577,946 B2 | 6/2003 | Myr |
| 6,615,135 B2 | 9/2003 | Davies |
| 6,621,420 B1 | 9/2003 | Poursartip |
| 6,633,238 B2 | 10/2003 | Lemelson et al. |
| 6,675,085 B2 * | 1/2004 | Straub .................... 701/93 |
| 6,708,085 B2 * | 3/2004 | Yamane et al. ............... 701/1 |
| 6,708,107 B2 * | 3/2004 | Impson et al. ............. 701/117 |
| 6,711,493 B1 * | 3/2004 | Andrews et al. ........... 701/117 |
| 6,741,933 B1 * | 5/2004 | Glass .................... 701/213 |
| 6,751,549 B1 * | 6/2004 | Kozak .................... 701/209 |
| 6,785,606 B2 | 8/2004 | DeKock et al. |
| 6,801,638 B1 | 10/2004 | Janssen et al. |
| 6,801,850 B1 * | 10/2004 | Wolfson .................. 701/209 |
| 6,850,841 B1 | 2/2005 | Casino |
| 6,853,913 B2 * | 2/2005 | Cherveny et al. .......... 701/208 |
| 6,882,930 B2 * | 4/2005 | Trayford et al. ........... 701/117 |
| 6,931,322 B2 | 8/2005 | Jung et al. |
| 6,941,220 B2 | 9/2005 | Le et al. |
| 6,941,221 B2 | 9/2005 | Draeger et al. |
| 6,989,766 B2 | 1/2006 | Mese et al. |
| 6,992,598 B2 * | 1/2006 | Poltorak ................ 340/995.19 |
| 7,053,780 B1 | 5/2006 | Straub et al. |
| 7,079,946 B2 | 7/2006 | Hunzinger |
| 7,162,367 B2 | 1/2007 | Lin et al. |
| 7,239,962 B2 | 7/2007 | Plutowski |
| 7,366,606 B2 * | 4/2008 | Uyeki .................... 701/117 |
| 7,382,274 B1 | 6/2008 | Kermani et al. |
| 7,432,826 B2 | 10/2008 | Schwartz |
| 7,433,889 B1 * | 10/2008 | Barton .................... 1/1 |
| 7,477,984 B2 | 1/2009 | Zhang et al. |
| 7,522,940 B2 | 4/2009 | Jendbro et al. |
| 7,589,643 B2 | 9/2009 | Dagci et al. |
| 7,680,588 B2 | 3/2010 | Tsukamoto |
| 7,818,116 B1 | 10/2010 | Nesbitt |
| 7,912,637 B2 | 3/2011 | Horvitz et al. |
| RE42,807 E | 10/2011 | Harris |
| 8,040,254 B2 | 10/2011 | Delia et al. |
| 8,102,253 B1 | 1/2012 | Brady, Jr. |
| 8,427,303 B1 | 4/2013 | Brady, Jr. et al. |
| 8,576,069 B2 | 11/2013 | Nadeem et al. |
| 2001/0001848 A1 * | 5/2001 | Oshizawa et al. .......... 701/210 |
| 2001/0020213 A1 | 9/2001 | Hatano |
| 2001/0029425 A1 * | 10/2001 | Myr ...................... 701/200 |
| 2001/0050620 A1 | 12/2001 | Lee |
| 2002/0067289 A1 | 6/2002 | Smith |
| 2002/0120390 A1 * | 8/2002 | Bullock .................. 701/117 |
| 2002/0126023 A1 | 9/2002 | Awada |
| 2003/0016143 A1 | 1/2003 | Ghazarian |
| 2003/0060977 A1 * | 3/2003 | Jijina et al. .............. 701/210 |
| 2003/0069683 A1 | 4/2003 | Lapidot et al. |
| 2003/0078720 A1 | 4/2003 | Adachi |
| 2003/0191568 A1 | 10/2003 | Breed |
| 2004/0030670 A1 * | 2/2004 | Barton .................... 707/1 |
| 2004/0130442 A1 | 7/2004 | Breed et al. |
| 2004/0189489 A1 | 9/2004 | Terui |
| 2004/0267440 A1 | 12/2004 | DeKock et al. |
| 2005/0134478 A1 | 6/2005 | Mese et al. |
| 2005/0149259 A1 | 7/2005 | Cherveny et al. |
| 2005/0187701 A1 | 8/2005 | Baney |
| 2005/0227696 A1 | 10/2005 | Kaplan et al. |
| 2005/0283312 A1 | 12/2005 | Taliwal |
| 2006/0095199 A1 | 5/2006 | Lagassey |
| 2006/0265294 A1 | 11/2006 | de Sylva |
| 2006/0282214 A1 | 12/2006 | Wolterman |
| 2006/0293852 A1 | 12/2006 | Tsurumi |
| 2007/0001830 A1 | 1/2007 | Dagci et al. |
| 2007/0005240 A1 | 1/2007 | Oumi et al. |
| 2007/0010942 A1 | 1/2007 | Bill |
| 2007/0021905 A1 | 1/2007 | Takashima |
| 2007/0027583 A1 | 2/2007 | Tamir et al. |
| 2007/0038362 A1 | 2/2007 | Gueziec |
| 2007/0103341 A1 | 5/2007 | Kreiner et al. |
| 2007/0208492 A1 | 9/2007 | Downs et al. |
| 2007/0222638 A1 | 9/2007 | Chen et al. |
| 2007/0225912 A1 | 9/2007 | Grush |
| 2008/0004789 A1 | 1/2008 | Horvitz et al. |
| 2008/0082251 A1 | 4/2008 | Ishikawa et al. |
| 2008/0088479 A1 | 4/2008 | Caminiti et al. |
| 2008/0094250 A1 | 4/2008 | Myr |

(56) References Cited

U.S. PATENT DOCUMENTS

| | | | |
|---|---|---|---|
| 2008/0180281 | A1 | 7/2008 | Bilimoria et al. |
| 2008/0218380 | A1 | 9/2008 | Wall et al. |
| 2008/0249713 | A1 | 10/2008 | Sessions |
| 2008/0275629 | A1 | 11/2008 | Yun |
| 2009/0005984 | A1 | 1/2009 | Bradley |
| 2009/0051568 | A1 | 2/2009 | Corry et al. |
| 2009/0070031 | A1* | 3/2009 | Ginsberg ............... 701/208 |
| 2009/0088965 | A1 | 4/2009 | Burckart et al. |
| 2009/0138187 | A1 | 5/2009 | Mathias |
| 2009/0138189 | A1 | 5/2009 | Kim et al. |
| 2010/0070128 | A1 | 3/2010 | Johnson |
| 2010/0094583 | A1 | 4/2010 | Borean et al. |
| 2010/0145569 | A1 | 6/2010 | Bourque et al. |
| 2010/0145587 | A1 | 6/2010 | Son |
| 2010/0171640 | A1 | 7/2010 | Delia et al. |
| 2012/0029730 | A1 | 2/2012 | Nagura et al. |
| 2012/0086582 | A1 | 4/2012 | Durekovic et al. |
| 2012/0139754 | A1 | 6/2012 | Ginsberg et al. |
| 2012/0274481 | A1 | 11/2012 | Ginsberg et al. |
| 2013/0297124 | A1 | 11/2013 | Be et al. |

FOREIGN PATENT DOCUMENTS

| | | |
|---|---|---|
| EP | 1 288 883 | 3/2003 |
| JP | 08-269921 A | 10/1996 |
| JP | 2009/245326 | 10/2009 |
| WO | WO 2005/019000 A1 | 3/2005 |

OTHER PUBLICATIONS

United States Office Action, U.S. Appl. No. 13/772,941, Jul. 22, 2013, sixteen pages.
European Patent Office, Supplementary European Search Report and Opinion, European Patent Application No. 10808489.8, Feb. 22, 2013, nine pages.
United States Office Action, U.S. Appl. No. 12/639,770, Jun. 7, 2013, thirty-two pages.
United States Office Action, U.S. Appl. No. 13/542,938, Aug. 16, 2013, thirty-four pages.
United States Office Action, U.S. Appl. No. 12/821,349, Jun. 20, 2013, twenty-three pages.
United States Office Action, U.S. Appl. No. 13/352,013, Jun. 21, 2013, twenty-one pages.
Taiwan R.O.C. Intellectual Property Office, Office Action, Taiwan Patent Application No. 100121872, Sep. 16, 2013, fourteen pages.
United States Office Action, U.S. Appl. No. 12/639,770, Oct. 23, 2013, thirty pages.
United States Office Action, U.S. Appl. No. 12/821,349, Oct. 23, 2013, twenty-six pages.
Aoude, G. et al., "Behavior Classification Algorithms at Intersections and Validation using Naturalistic Data," Jul. 2011, six pages. [Online] [Retrieved Jun. 5, 2012] Retrieved from the Internet <URL:http://acl.mit.edu/papers/IV11AoudeDesarajuLaurensHow.pdf.>.
Faezipour, M. et al., "Progress and Challenges in Intelligent Vehicle Area Networks," Communications of the ACM, Feb. 2012, pp. 90-100, vol. 55, No. 2.
Gminsidenews.Com, "DCS Preps Safety System to Prevent Red-Light Running," Jun. 18, 2006, eleven pages. [Online] [Retrieved Jan. 23, 2012] Retrieved from the Internet <URL:http://www.gminsidenews.com/forums/f58/dcx-preps-safety-system-prevent-red-light-running-32921/.>.
Inman, V. et al., "The Effects of In-Vehicle and Infrastructure-Based Collision Warning at Signalized Intersections," Federal Highway Administration (FHWA), Publication No. FHWA-HRT-09-049, Dec. 2009, forty-six pages. [Online] [Retrieved Jan. 23, 2012] Retrieved from the Internet <URL:http://www.fhwa.dot.gov/publications/research/safety/09049/09049.pdf.>.
Intelligent Transportation Society of America, "Transportation, Rebirth!: Migration to Vehicle Infrastructure Integration (VII)," VII Technology Showcase and ITS America VII Initiative Outreach Program, Date Unknown, twenty-seven pages. [Online] [Retrieved Jan. 23, 2012] Retrieved from the Internet <URL:http://fortworth.texite.org/Site.Files/TexITE%20presentationMay07.pdf.>.
Intellione Technologies Corp., "io-locate: Strike While the Customer is Near," 2009 [Online] [Retrieved Aug. 16, 2010] Retrieved from the Internet URL:http://www.intellione.com/ioLocate.html>.
Intellione Technologies Corp., "io-traffic: Traffic Data at the Speed of Business," 2008 [Online] [Retrieved Aug. 16, 2010] Retrieved from the Internet URL:http://www.intellione.com/io-traffic_information_sheet.pdf>.
Intellione Technologies Corp., "io-vector: Beat Traffic at Its Own Game," 2008 [Online] [Retrieved Aug. 16, 2010] Retrieved from the Internet URL:http://www.intellione.com/io-vector_information_sheet.pdf>.
Maile, M. et al., "Cooperative Intersection Collision Avoidance System for Violations (CICAS-V) for Avoidance of Violation-Based Intersection Crashes," *Mercedes-Benz Research & Development North America, Inc., USA*, Paper No. 09-0118, 2009, fourteen pages. [Online] [Retrieved Jun. 5, 2012] Retrieved from the Internet <URL:http://www-nrd.nhtsa.dot.gov/pdf/esv/esv21/09-0118.pdf.>.
PCT International Search Report and Written Opinion, PCT Application No. PCT/US2010/038863, Aug. 17, 2010, 10 pages.
PCT International Search Report and Written Opinion, PCT Application No. PCT/US2011/040279, Oct. 13, 2011, six pages.
Strauss, S. "Traffic Magic," University Affairs, Dec. 7, 2009 [Online] [Retrieved Aug. 17, 2010] Retrieved from the Internet URL:http://www.universityaffairs.ca/Print.aspx?id=7102>.
United States Patent and Trademark Office, Non-Final Rejection, U.S. Appl. No. 12/821,349, Nov. 2, 2012, 17 pages.
United States Patent and Trademark Office, Non-Final Rejection, U.S. Appl. No. 12/639,770, Oct. 24, 2012, 31 pages.
United States Patent and Trademark Office, Non-Final Rejection, U.S. Appl. No. 12/886,100, Dec. 31, 2012, 15 pages.
United States Patent and Trademark Office, Non-Final Rejection, U.S. Appl. No. 13/372,391, Dec. 18, 2012, 17 pages.
United States Patent and Trademark Office, Non-Final Rejection, U.S. Appl. No. 13/352,013, Dec. 17, 2012, 21 pages.
United States Patent and Trademark Office, Non-Final Rejection, U.S. Appl. No. 13/542,938, Dec. 28, 2012, 30 pages.
United States Office Action, U.S. Appl. No. 13/372,391, Jul. 8, 2013, nineteen pages.
State Intellectual Property Office of the People's Republic of China, First Office Action, Chinese Patent Application No. 201080043533.8, Nov. 27, 2013, forty-seven pages.
United States Office Action, U.S. Appl. No. 13/425,707, Jan. 22, 2014, ten pages.
United States Office Action, U.S. Appl. No. 13/542,938, Mar. 27, 2014, thirty-nine pages.
Australian Government, IP Australia, Patent Examination Report No. 1, Nov. 28, 2013, three pages.
European Patent Office, Examination Report, European Patent Application No. 10808489.8, Nov. 14, 2013, five pages.
United States Office Action, U.S. Appl. No. 13/372,391, Dec. 30, 2013, seventeen pages.
State Intellectual Property Office of the People's Republic of China, First Office Action, Chinese Patent Application No. 201080043533.8, Jul. 3, 3024, thirty-two pages.
United States Office Action, U.S. Appl. No. 13/542,938, Oct. 8, 2014, forty pages.
United States Office Action, U.S. Appl. No. 13/747,145, Jun. 5, 2014, thirteen pages.
United States Office Action, U.S. Appl. No. 13/775,649, Sep. 29, 2014, fourteen pages.

* cited by examiner

SYSTEM AND METHOD FOR AUTOMATED UPDATING OF MAP INFORMATION

BACKGROUND

1. Field of Art

The present invention generally relates to updating databases of road map information that can be used for vehicle navigation or similar purposes.

2. Description of the Related Art

Digital databases of road map information are essential components of a variety of useful applications, such as vehicle routing. The road map information databases used in vehicle routing systems describe the layout and characteristics of the roads over which vehicles travel, such as the locations of various roads and their intersections, traffic speeds over the various road segments, and the like. The use of real-time location data, such as that provided by a satellite-based Global Positioning System (GPS), in conjunction with such databases allows a vehicle routing system to determine the location of a user's vehicle and to take actions useful to the user, such as suggesting directions to a desired destination from the current location. As the database information is augmented to describe additional characteristics of roads and traffic conditions, the applications using the database are thereby enabled to provide additional, more useful features. For example, the addition to a database of information regarding real-time traffic conditions enables a vehicle routing application to suggest not only a route that minimizes overall distance, but also one that minimizes driving time based on the current traffic speeds associated with the route.

However, databases frequently lack important categories of information that applications could use to provide more accurate results or entirely new categories of features. Some examples of information that is not generally available are the locations of stop signs and traffic lights, information about whether traffic lights are timed or untimed to coordinate with traffic flow, and information about the illegality of certain turns at certain times of day. As an example of the utility of such information, information about the illegality of certain turns at certain times of day could be used to detect that a route that was optimal at 11:00 AM would be entirely prohibited at 6:00 PM, thus avoiding proposing an invalid route to the user.

Of additional concern is the fact that database information may contain inaccuracies due to human error on the part of those creating the database, or due to failures to timely update the database to reflect actual changes in the roads themselves subsequent to the creation of the database. For example, a database may erroneously indicate that two road segments are disconnected when they are in fact connected, or vice-versa.

Some commentators have discussed the possibility of using in-vehicle GPS units to correct one of the deficiencies found in many databases—the lack of information on traffic speeds—by amalgamating the individual vehicle speeds recorded by GPS units over many vehicles to obtain statistical information about likely vehicle speeds on a particular road segment at a given time. However, there remain many other database information deficiencies for which no automated solutions have been discussed, although the need to address these deficiencies becomes ever more pressing as the number of related routing applications grows.

SUMMARY

As disclosed herein, map database information is augmented and corrected using information obtained by recording the movements of a vehicle equipped with a positioning system device, deriving additional map details based upon those movements, and updating the database to reflect the additional details.

Some embodiments of the invention augment a map database by deriving entirely new categories of information not previously tracked by the database. In one embodiment, the presence of stop signs is detected by observing locations where the vehicle in question comes to a stop when arriving at an intersection. Similarly, the absence of a stop sign is detected by the fact of the vehicle proceeding through the intersection unimpeded. In another embodiment, stop signs are identified by a reduction in speed below some specific threshold, such as 5 MPH. Thus, embodiments of the invention can be used to derive additional information about characteristics of the roads themselves, independent of current traffic conditions.

In another embodiment, traffic lights are identified by finding intersections where the vehicle in question sometimes comes to rest for extended periods of time, and sometimes proceeds through the intersection without interruption. By examining the correlations between the apparent states of the traffic lights (red or green), it can be determined whether the lights on a particular road are timed to coordinate with each other.

Other embodiments correct errors of existing map database information. In one such embodiment, a vehicle is observed transitioning between two road segments that are not indicated by the database as being connected, and in response a connection is added to the map database. In another such embodiment, the fact that the vehicle never makes a transition between two segments, when such a transition is either clearly advantageous given the eventual destination of the vehicle or has been suggested by the navigation system, implies that the map database is in error and that no such connection in fact exists. A further refinement of this approach allows for the automated identification of time-dependent connections, such as intersections where a left turn is permitted only at certain times of day.

In one embodiment, the additional information collected by such techniques is used to update the global map database for all users, such as by connecting the local system of the user's vehicle to a fixed or mobile network. However, the information gathered is of significant use even when it is retained only on the local map database of a user's GPS device. This is because most drivers spend the majority of their driving time in relatively restricted locales, and will therefore benefit from enhancing their map databases in those locales even in the absence of an ability to share data with other users. Thus, in another embodiment the information gathered is used to update only the local map database of the user from whom the GPS data is obtained.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Method Overview

Embodiments of the invention perform various map database augmentation and correction techniques to derive additional information not currently within the map database, or to discover inconsistencies within the database and to correct them. Such techniques conform to the general pattern set forth in FIG. 1. At step 105 of FIG. 1, vehicle readings are received. Such vehicle readings are provided, for example, by conventional satellite-based GPS systems, and include location (e.g. latitude and longitude) and velocity (e.g. speed and heading) information for the vehicle to which they correspond. At step 110, these received vehicle readings are analyzed in conjunction with existing information already stored within the map database and possibly in conjunction with other readings from the same vehicle. As a result, further map-related information is derived. Finally, at step 115 the further information is stored within the database. If the further information is inconsistent with that already within the database, then this involves replacing such prior information, given that the further information is considered more reliable.

System Architecture

Figure 1:
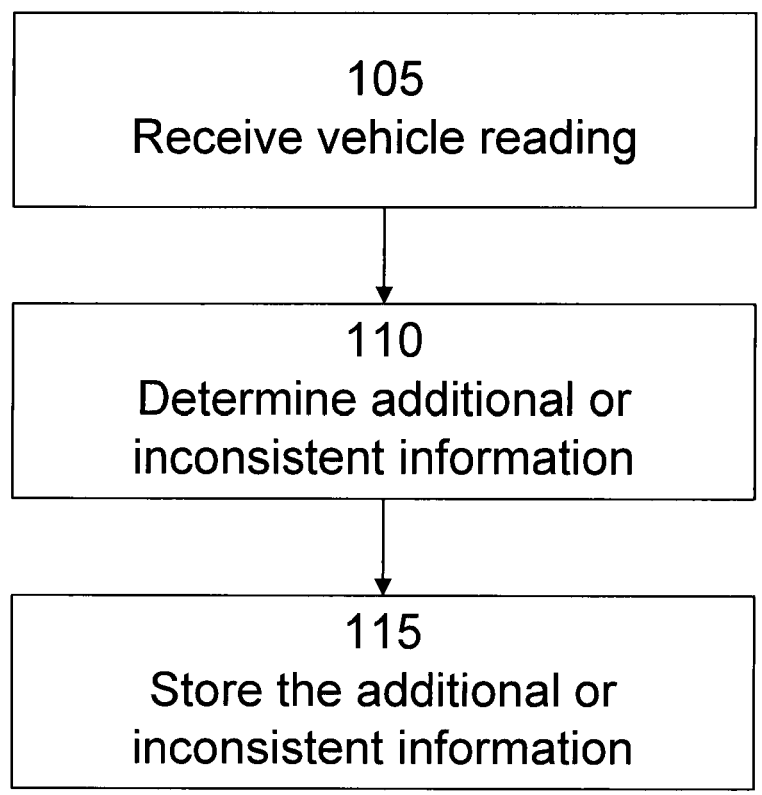
FIG. 1 is a flowchart illustrating high-level steps performed according to one embodiment.
Figure 2:
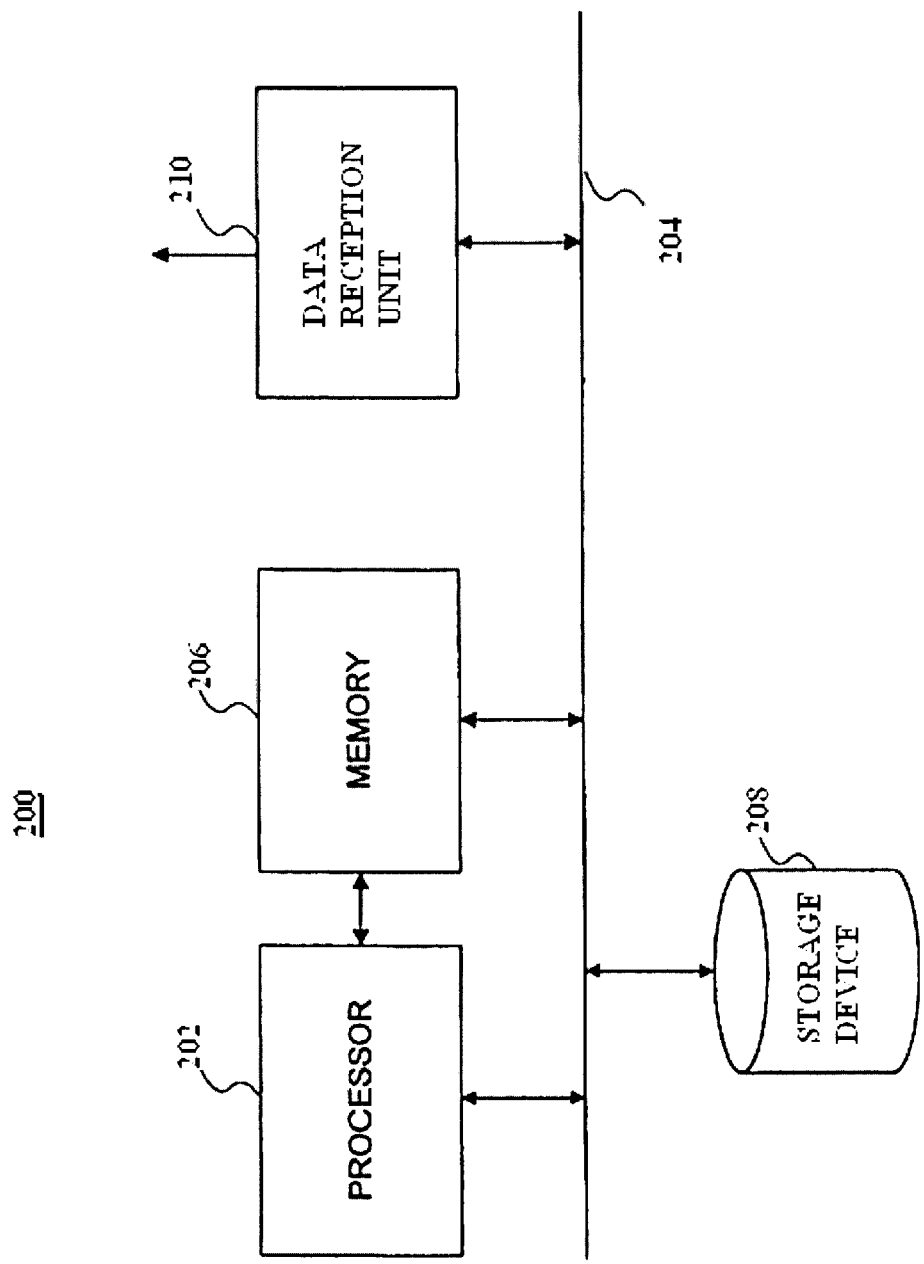
FIG. 2 is a high-level block diagram illustrating a computing device for implementing a preferred embodiment.

FIG. 2 is a high-level block diagram illustrating a user device 200 for modifying map databases according to the general technique set forth in FIG. 1. In one embodiment, user device 200 is a positioning system, such as a conventional handheld navigation system, and is placed within or otherwise forms a part of the user's vehicle. Processor 202 is conventionally coupled to memory 206 and bus 204. Also coupled to the bus 204 are memory 206, storage device 208, and data reception unit 210. The data constituting the map database is contained in storage device 208 and loaded into memory 206. The general structure of a map database is well-known to those of skill in the art, and conventionally involves storing a series of data objects representing the series of road segments that describes the road, including the limits of the road segment and information associated with the segment, such as speed limit.

In a typical embodiment, processor 202 is any general or specific purpose processor such as an INTEL 386 compatible central processing unit (CPU). Storage device 208 is any device capable of persistently storing large amounts of data as required by the map database, such as a hard drive or a high-capacity memory card. Memory 206 holds instructions and data used by the processor 202. The reception unit 210, such as a GPS receiver, at fixed or varying time intervals produces vehicle readings based on information such as that provided by a GPS environment. The instructions stored in the memory 206 and executed by the processor 202 allow the derivation of additional map information based upon the vehicle readings and the subsequent storing of the additional information within the map database for later use by a navigation or other program.

One of skill in the art would recognize that the above described system is merely for purposes of example, and that many other configurations for implementing the invention are equally possible. For example, although the above-disclosed embodiment of FIG. 2 describes a user device 200 that is located within a vehicle, so that the map database is local, in another embodiment a shared version of the map database may be stored so as to be globally accessible. In such an embodiment, a separate computer hosts and provides a global version so the map database, although the user device 200 still retains a local copy thereof. Modifications to the local databases can then be communicated to and reflected in the global database, enabling the additional information derived by the invention to be made accessible to all users of the global database, rather than only to the user on behalf of whom they were produced. The modified local data is communicated to a system hosting the global database at different intervals in different embodiments, such as when the vehicle is serviced, or at frequent, regular intervals via the use of a wireless network infrastructure. In embodiments where such communication with the global database is frequent, it is possible to consider readings from other vehicles, in addition to those of the local vehicle itself, when deriving additional information to be stored locally.

Database Updating Operations

The various map database augmentation and correction techniques performed by embodiments of the invention as set forth in FIG. 1 are now described in more detail below. As previously discussed, such operations apply the information, such as vehicle location and speed, provided by a user device to existing information stored in the map database, deriving additional or corrected information and updating the database therewith.

In one embodiment, the presence or absence of traffic control signals such as stop signs or traffic lights is detected by observing the speed of a vehicle arriving at an intersection. More specifically, if the system detects that a vehicle stop has occurred at an intersection, it infers the presence of a traffic control signal, such as stop sign or a red light. Similarly, it infers the absence of a stop sign (and of a red light) from a failure of a vehicle to stop. A stop is indicated by the speed value of the vehicle reading being zero. Alternately, a stop may be indicated by the speed value falling below a threshold, such as a fixed threshold (e.g. 5 MPH), or a variable threshold (e.g. 15% of the speed limit associated with the given location, if such a speed limit is stored within the map database). This alternate technique accounts for the fact that many vehicles fail to stop completely at a stop sign, instead merely decreasing their speed to a very low level before continuing. A vehicle reading is interpreted as being at an intersection if it is within a given distance of a location indicated in the map database as constituting an intersection.

The system examines the relative frequency of stops versus failures to stop at the given location, requiring a sufficiently high percentage of stops at that same location before inferring the presence of a traffic control signal. This prevents temporary conditions, such as construction work or the crossing of a pedestrian, from incorrectly indicating the presence of a traffic signal. In an embodiment wherein a global version the traffic database is accessible to the local users and is updated in real time, the information relating to stops may be that of all vehicles at that intersection, and not merely those of the same vehicle at different times.

If the system determines that a traffic control signal is present, then it must additionally determine the type of signal, such as a stop sign or a red light. To do so, the system stores the time at which the stop event took place, and then calculates the lapse of time before a positive speed reading is again detected. (Again, a threshold positive speed may be employed to prevent minor movements from being incorrectly identified as a recommencement of driving.) Stop signs are differentiated from red lights based on this time lapse, with time lapses below a given threshold being considered to indicate stop signs, and time lapses at or above the threshold indicating red lights. After detecting a probable red light, the system subsequently confirms the presence of a traffic light by observing later readings from other the same vehicle at that same intersection that register little to no reduction in speed when crossing, indicating a yellow or green light. In embodiments providing a frequently-updated global database, the subsequent confirmation can be accomplished more quickly by examining the readings of other vehicles, rather than waiting for the same vehicle to return to the intersection.

An alternate embodiment performs similar actions to determine the probable presence of a traffic light. In such an embodiment, the presence of a traffic light at a given location is inferred based not upon a stop that lasts a longer time than is typical for a stop sign, but solely upon the disparity between the occurrence of stops at some times, and failures to stop at other times. Such an inference is stronger when the stops and failures to stop occur in a series that alternates over short periods of time, e.g. one minute.

Another embodiment additionally determines whether detected traffic lights are timed to coordinate with each other by examining the correlations between the apparent states of the traffic lights (e.g. red or green). More specifically, given a range of intersections indicated by the map database to be adjacent to each other and to be controlled by traffic lights, the system determines whether a given vehicle stops at the lights using the technique discussed above. If it is frequently the case that the vehicle stops at the first light in the range, but does not stop for the remaining lights, then the lights in the range are considered to be timed to coordinate with each other.

Other embodiments correct errors within existing information of the map database. One such embodiment updates the map database to reflect a previously-unknown connection between roads. Such an operation is useful, for example, when a connector road is constructed subsequent to the initial creation of the map database. In such an embodiment, the system notes that the vehicle readings correspond to a particular road segment within the map database, and subsequently notes at a later time that the readings have moved to another road segment, indicating that a connection exists between the road segments. The system then examines the map database, and if it determines that that no connection is indicated between the prior and current road segments, it updates the database to indicate the connection.

Another embodiment addresses the opposite situation: removing connections from the map database when vehicle readings indicate that the connection no longer exists. The system determines that no connection exists, for example, responsive to a failure of vehicles to transition between the two road segments in question. More specifically, the absence of a connection is inferred when such a transition has been suggested by a vehicle's GPS-based navigation system or is otherwise clearly advantageous given the eventual destination of the vehicle, yet the transition was not made. Such a method is more precise than merely assuming that a connection no longer exists based on a failure of vehicles to make a given transition, an inference that may prove incorrect in areas where the traffic level is low and where the transition represents an inefficient route, for example. Again, it is preferable to make the determination based upon the behavior of a vehicle or vehicles on a number of occasions, rather than just one, in order to improve the determination's accuracy.

Another embodiment refines the technique of the prior embodiment to allow for the automated identification of time-dependent connections, such as intersections where a left turn is permitted only at certain times of day. In such an embodiment, the determination of whether a navigable connection exists between two adjacent road segments is a function not only of the road segments themselves, but also of other variables, such as the time of day. Thus, a light that disallows left turns only between the hours of 6:00 AM and 7:00 PM is detected based upon the lack of transitions between the relevant road segments during those hours, and the presence of a statistically relevant number of transitions at other times.

Figure 3:
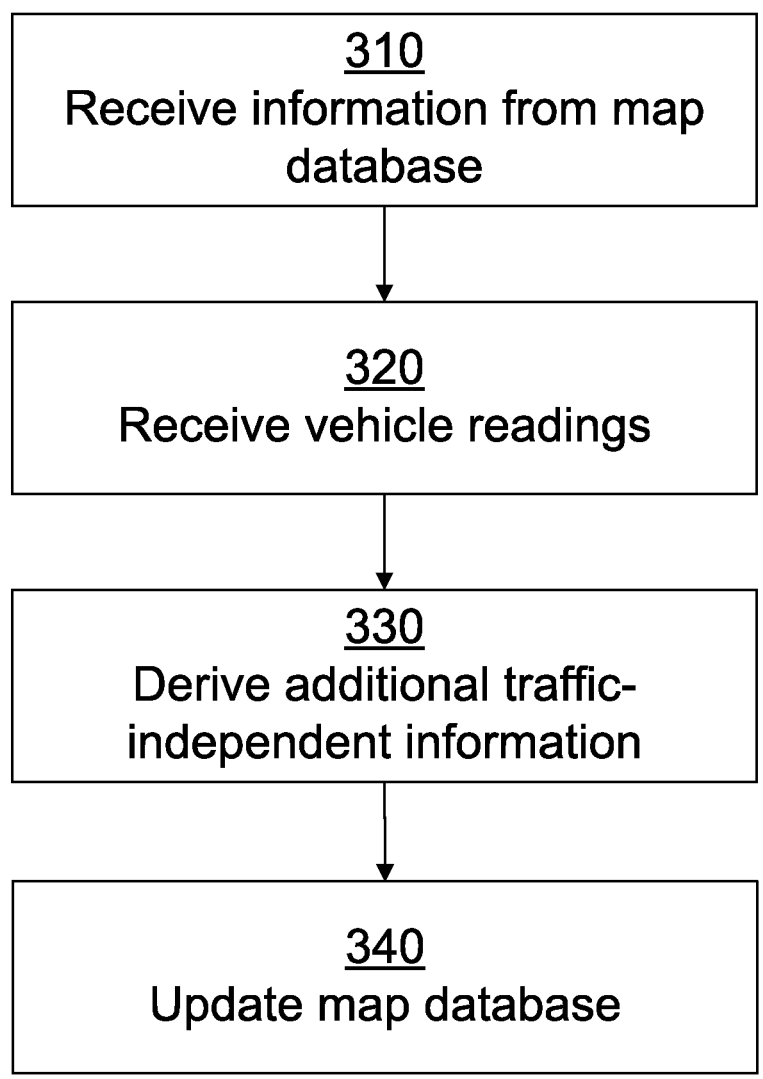
FIG. 3 is a flow chart illustrating high-level steps performed according to one embodiment.

FIG. 3 illustrates a general method 300 by which a map database is updated, consistent with the above embodiments. In step 310 map information is received from a map database. In step 320 vehicle readings are received. In the above described embodiments the vehicle readings comprise location and velocity data obtained from a satellite based GPS system. As described above with regards to FIG. 1, the map information and vehicle readings are analyzed to derive 330 additional map-related information (e.g., presence of stop signs, traffic lights, turn limitations and other traffic-independent information as more fully discussed below). As described above with regard to FIG. 2, in various embodiments the map database is stored locally or globally, and multiple vehicle readings from one or more vehicles are used in determining the additional traffic independent information. Finally, the map database is updated 340 to reflect the derived information.

Thus, embodiments of the invention allow the capture of numerous additional types of information not previously reflected within the map database, or correction of existing information determined to no longer be accurate, leading to greater functionality and greater accuracy for the increasing number of map applications that rely on such information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, the words "a" or "an" are employed to describe elements and components of the invention. This is done merely for convenience and to give a general sense of the invention. This description should be read to include one or at least one and the singular also includes the plural unless it is obvious that it is meant otherwise.

Certain aspects of the present invention include process steps and instructions described herein in the form of a method. It should be noted that the process steps and instructions of the present invention could be embodied in software, firmware or hardware.

The computer program for deriving additional information is preferably persistently stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Upon reading this disclosure, those of skill in the art will appreciate still additional alternative structural and functional designs for a system and a process for automated updating of a map database through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A system for automatically updating a map database, comprising:
    an input subsystem configured to provide vehicle readings, each vehicle reading corresponding to a vehicle and comprising a location of the vehicle;
    a map database comprising information associated with roads; and
    an information inference module configured to determine that a type of traffic control at an approach to an intersection is either a stop sign or a traffic light, the stop sign being indicated by substantially all the vehicle readings corresponding to the approach indicating substantially all vehicles stopping, and the traffic light being indicated by a first portion of the vehicle readings corresponding to the approach indicating vehicles stopping at the intersection at some times and a second portion of the vehicle readings corresponding to the approach indicating vehicles not stopping at other times, the information inference module further configured to update the map database to reflect the type of traffic control.

2. The system of claim 1, wherein the information inference module is further configured to determine whether traffic lights of a range of adjacent traffic lights are timed relative to one another.

3. The system of claim 1, wherein the information inference module is further configured to determine the type of traffic control further based at least in part upon a time of day associated with the vehicle readings.

4. The system of claim 1, wherein the map database is configured to store the determined type of traffic control at the approach by modifying the map database.

5. A computer-based method for automatically updating a map database, comprising:
    receiving map information from the map database at a processor, the map database comprising information associated with roads;
    receiving vehicle readings at the processor, each vehicle reading corresponding to a vehicle and comprising a location of the vehicle;
    determining, via the processor, that a type of traffic control at an approach to an intersection is either a stop sign or a traffic light, the stop sign being indicated by substantially all the vehicle readings corresponding to the approach indicating substantially all vehicles stopping, and the traffic light being indicated by a first portion of the vehicle readings corresponding to the approach indicating vehicles stopping at the intersection at some times and a second portion of the vehicle readings corresponding to the approach indicating vehicles not stopping at other times; and
    updating the map database to reflect the type of traffic control.

6. The method of claim 5, further comprising determining, with the processor, whether traffic lights of a range of adjacent traffic lights are timed relative to one another.

7. The method of claim 5, wherein determining the type of traffic control at the approach is further based at least in part upon a time of day associated with the vehicle readings.

8. The method of claim 5, further comprising storing the determined type of traffic control at the approach by modifying the map database.

9. A non-transitory computer readable storage medium storing a computer program executable by a processor for automatically updating a map database, actions of the computer program comprising:
    receiving map information from the map database, the map database comprising information associated with roads;
    receiving vehicle readings, each vehicle reading corresponding to a vehicle and comprising a location of the vehicle;
    determining that a type of traffic control at an approach to an intersection is either a stop sign or a traffic light, the stop sign being indicated by substantially all the vehicle readings corresponding to the approach indicating substantially all vehicles stopping, and the traffic light being indicated by a first portion of the vehicle readings corresponding to the approach indicating vehicles stopping at the intersection at some times and a second portion of the vehicle readings corresponding to the approach indicating vehicles not stopping at other times; and
    updating the map database to reflect the type of traffic control.

10. The computer readable storage medium of claim 9, the actions of the computer program further comprising determining whether traffic lights of a range of adjacent traffic lights are timed relative to one another.

11. The computer readable storage medium of claim 9, wherein determining the type of traffic control at the approach is further based at least in part upon a time of day associated with the vehicle readings.

12. The computer readable storage medium of claim 9, further comprising storing the determined type of traffic control at the approach by modifying the map database.

* * * * *